(12) United States Patent
Senanayake et al.

(10) Patent No.: US 8,928,582 B2
(45) Date of Patent: Jan. 6, 2015

(54) METHOD FOR ADAPTIVE INTERACTION WITH A LEGACY SOFTWARE APPLICATION

(75) Inventors: Rukman Senanayake, San Jose, CA (US); Grit Denker, Palo Alto, CA (US); Patrick D. Lincoln, Woodside, CA (US); John Murray, Portola Valley, CA (US); Steven S. Weiner, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 449 days.

(21) Appl. No.: 13/399,183

(22) Filed: Feb. 17, 2012

(65) Prior Publication Data

US 2013/0215005 A1     Aug. 22, 2013

(51) Int. Cl.
| | |
|---|---|
| G09G 5/00 | (2006.01) |
| G06F 3/00 | (2006.01) |
| G05B 11/01 | (2006.01) |
| G08C 19/16 | (2006.01) |
| G06F 3/041 | (2006.01) |

(52) U.S. Cl.
USPC ......... 345/156; 715/740; 340/12.22; 345/173

(58) Field of Classification Search
CPC ..... G06F 3/0488–3/04886; G06F 3/041–3/04; G06F 2203/04808
USPC ................... 345/156–184; 178/18.01–20.04; 340/12.22–12.55; 715/740
See application file for complete search history.

(56) References Cited

U.S. PATENT DOCUMENTS

| | | | |
|---|---|---|---|
| 6,337,678 B1 | 1/2002 | Fish | |
| 8,355,007 B2 * | 1/2013 | Kukulski | 345/173 |
| 8,375,328 B2 * | 2/2013 | Koh et al. | 715/810 |
| 8,375,336 B2 * | 2/2013 | Matthews et al. | 715/863 |
| 8,525,808 B1 * | 9/2013 | Buening | 345/173 |
| 8,717,323 B2 * | 5/2014 | Kukulski | 345/173 |
| 2005/0030292 A1 * | 2/2005 | Diederiks | 345/173 |
| 2005/0057528 A1 | 3/2005 | Kleen | |
| 2006/0197750 A1 * | 9/2006 | Kerr et al. | 345/173 |
| 2006/0267957 A1 * | 11/2006 | Kolmykov-Zotov et al. | 345/173 |
| 2007/0061272 A1 * | 3/2007 | Delgrosso et al. | 705/76 |
| 2008/0100572 A1 | 5/2008 | Boilot | |
| 2008/0252595 A1 | 10/2008 | Boilot | |
| 2008/0309624 A1 * | 12/2008 | Hotelling | 345/173 |
| 2010/0283747 A1 * | 11/2010 | Kukulski | 345/173 |
| 2011/0113353 A1 * | 5/2011 | Koh et al. | 715/760 |
| 2011/0199342 A1 | 8/2011 | Vartanian et al. | |
| 2012/0032945 A1 * | 2/2012 | Dare et al. | 345/418 |
| 2012/0050200 A1 | 3/2012 | Vartanian et al. | |
| 2012/0313854 A1 | 12/2012 | Senanayake et al. | |

(Continued)

*Primary Examiner* — Patrick F Marinelli

(57) ABSTRACT

Methods are disclosed to support adaptive interaction with legacy software applications, without a need for rewriting those applications. The methods are for use with an interactive electronic system including a processor, a display, and an input device with user-manipulated controls. When the legacy application is executed, a supplemental software program, such as a plugin, is also executed and is utilized in order to identify currently relevant interactive features of the legacy application during execution. Functionality is dynamically assigned to the various user-manipulated controls based on the identified features. In one embodiment, detection of objects (particularly the user's hands) proximate to the input controls is also employed in determining the assignment of functionality and/or in displaying a visual representation to the user of the available interactive choices. In another embodiment, the user-manipulated input controls are dynamically and physically reconfigured under control of the processor based on the identified features.

15 Claims, 10 Drawing Sheets

(56) References Cited

U.S. PATENT DOCUMENTS

| | | |
|---|---|---|
| 2012/0313857 A1 | 12/2012 | Senanayake et al. |
| 2013/0106754 A1* | 5/2013 | Kukulski ............... 345/173 |
| 2013/0215038 A1* | 8/2013 | Senanayake et al. ......... 345/169 |

* cited by examiner

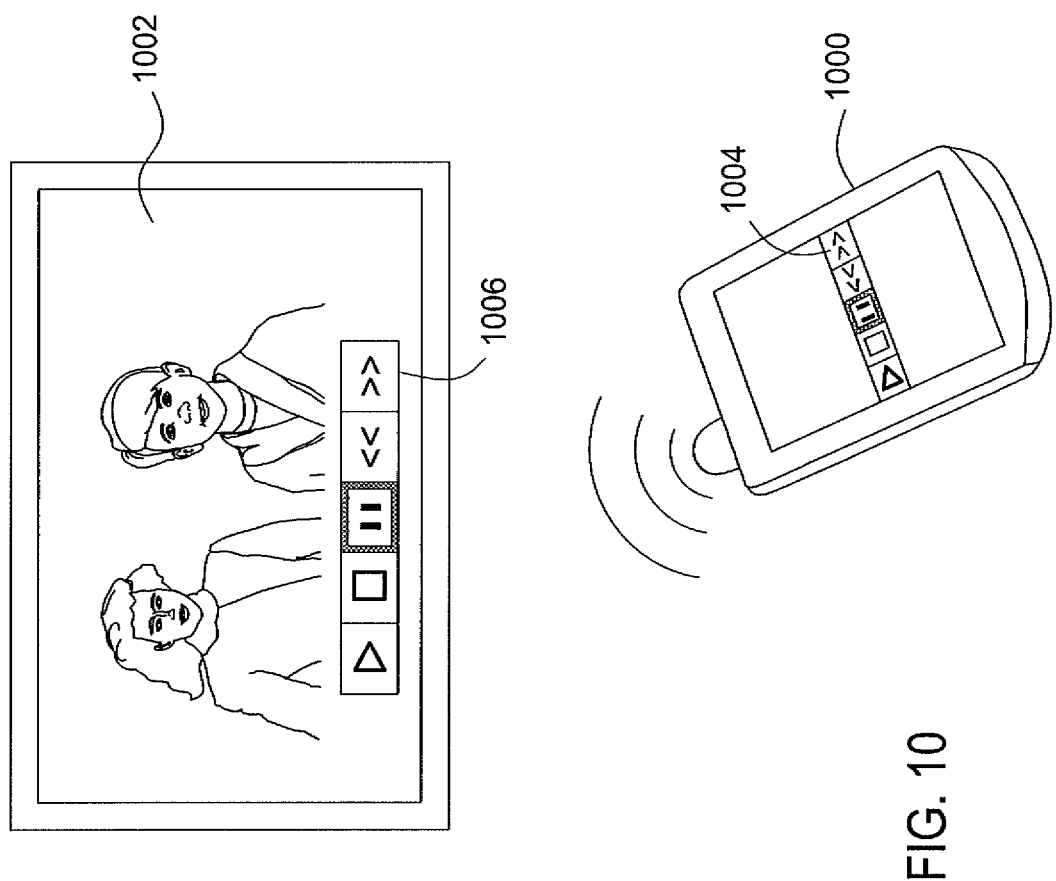

METHOD FOR ADAPTIVE INTERACTION WITH A LEGACY SOFTWARE APPLICATION

FIELD OF THE INVENTION

The present invention relates generally to technology for interacting with computer systems (or other interactive electronic systems such as electronic instruments, microprocessor controlled displays, and the like), and relates more particularly to input devices for interacting with such systems.

BACKGROUND OF THE DISCLOSURE

Increasingly, users of computers and other electronic devices expect to interact with such devices by entering input through touch and gestures. Conventional mechanisms supporting such input include touch screens, i.e. visual display screens that also detect contact or pressure within the display area as input. One drawback of touch screens is that conventionally, user-actuated input keys and buttons cannot also be located within the display area since such structures typically interfere with the display (but see co-pending U.S. patent application Ser. No. 13/158,122 entitled Adaptable Input/Output Device for additional innovative solutions). Consequently, many popular tablet computing products with touch screens (such as the Apple iPad™) may display a touch-sensitive on-screen keyboard as needed, but many users are frustrated by the absence of tactile feedback and the flat two-dimensionality of such virtual keyboards. Alternatively, many computing products provide a traditional keyboard separately from, and in addition to, a touch-sensitive input area such as a touchpad; in that case, the two different input mechanisms occupy non-overlapping areas of the device, presenting a challenge especially for mobile devices where space is scarce. Yet another existing alternative is the pressure-sensitive pointing stick or tracking stick, which occupies very little area and so can be located between the keys of a keyboard; however, the tiny surface area is impractical for complex movements and gestures (swiping, pinching, etc.), and typically only simple directional input is supported.

In addition, conventional input devices such as keyboards and remote controllers do not adapt physically to an end user's needs or working habits, in the sense that such devices typically cannot adjust their physical shape in response to the user's interactive context. For example, while the functionality associated with particular keys on a conventional computer keyboard can be reassigned by software to a variety of different functions, the keys do not change shape: the keys are not designed or enabled to dynamically change shape under processor control and to transform (e.g., into a smaller number of larger rectangles) based on the current usage context.

Moreover, depending on context and application, a user may wish to utilize an input device in a "heads-up" manner, i.e. the user may wish to keep their eyes on a display while simultaneously manipulating the input device. In a conventional input device, this may be a challenging feat. For instance, while using a conventional computer keyboard or remote control, if the user looks down at the keyboard or the remote in order to be certain of which keys/buttons he is pressing, the user will not be fully aware of what is being displayed at that moment on the display of the computer or other electronic device being controlled. Conversely, when viewing the display, the user may not be fully certain of which keys he is pressing on the keyboard or controller, or where his hands are positioned relative to particular keys/buttons on the keyboard or controller. At best, time may be lost and cognitive load may be increased as the user switches focus between the display and the input device(s).

SUMMARY OF THE INVENTION

The present invention relates, in part, to a hardware input device having actuated keys and/or buttons, with integrated proximity sensors and support for heads-up interaction with an electronic system. In one embodiment, a hardware input device accepts at least two modes of manual user input provided within the same surface area, including actuation (typically pressing) of multiple keys or buttons etc. as well as touch and/or gesturing by the user. The hardware input device includes actuated keys/buttons with associated sensors for detecting actuation, and a second set of sensors for detecting proximity of a user's extremities or the like, co-located on the input device. In one embodiment, infrared sensors for proximity detection are embedded inside or positioned directly underneath the traditional plastic keys of a keyboard in a computer system. This is especially advantageous in personal electronics devices for which input surface area is at a premium such as a laptop computer, tablet, phone, or remote control.

In further embodiments, the elevation of the actuated input elements can be controlled by a processor of the system, such that the physical configuration of keys and/or buttons available to the user can be dynamically and automatically reconfigured under program control. Additional aspects of the present invention include methods to facilitate a heads-up style of interaction using an input device with user-manipulated controls.

In further embodiments, adaptive interaction with legacy software applications is supported, without a need for rewriting the legacy applications in order to accommodate such adaptivity. In one embodiment, when a legacy application is executed, a supplemental software program, such as a plugin, is also executed and is utilized in order to identify currently relevant interactive features during execution. Functionality is dynamically assigned to various user-manipulated controls of the input device based on the identified features. In one embodiment, detection of objects (particularly the user's hands) proximate to the input controls is utilized in determining the assignment of functionality and/or in displaying a visual representation to the user of the available interactive choices. In another embodiment, the user-manipulated input controls are dynamically and physically reconfigured under control of the processor based on the identified features.

BRIEF DESCRIPTION OF THE DRAWINGS

The teachings of the present invention can be readily understood by considering the following detailed description in conjunction with the accompanying drawings, in which:

FIG. 10 is a flow diagram illustrating a method for interacting with a computing system in a "heads-up" manner, employing a software application interaction extension framework in an embodiment of the present invention.

To facilitate understanding, identical reference numerals have sometimes been used to designate elements common to multiple figures.

DETAILED DESCRIPTION

The present invention relates to an adaptable keyboard, or other input device having actuated keys and/or buttons (e.g. a remote controller), with integrated proximity sensors and support for heads-up interaction with a computer system or other interactive electronic system. Embodiments of the present invention can replace a combination of keyboard and mouse (or other conventional cursor control device) with a single input device in which actuated input elements (e.g. keys and/or buttons that can be pressed) are integrated and co-located with proximity sensors that detect nearby objects including the user's hand, fingers, or stylus, etc. This allows for an additional mode of manual user input (i.e. in addition to pressing the actuated input elements), namely a touch and/or gesture mode of input, without occupying any additional surface area on the input device. In a further aspect, the detected proximity information can be used by the electronic system to display a visual depiction of the proximate object (e.g. the user's hand) relative to input choices corresponding to the manipulable features of the adaptable input device (e.g. the actuated input elements). This visual depiction can be integrated with the output displayed by an active application, so that the user can interact in a heads-up manner with that application—in other words, the user can focus attention on the display screen rather than the input device—and still be aware of where their hands are positioned relative to each of the specific input keys or buttons that the user needs to press/actuate in order to enter input.

In still a further aspect, the elevation of the actuated input elements can be dynamically adapted under processor control in response to changing use contexts. Adaptation of the adaptable input device may, for example, be based on triggers including (a) the user's hand position and/or gestures, as detected by the proximity sensors, and (b) the context of active applications currently executing on the system, such as input fields of current interest.

Figure 1:
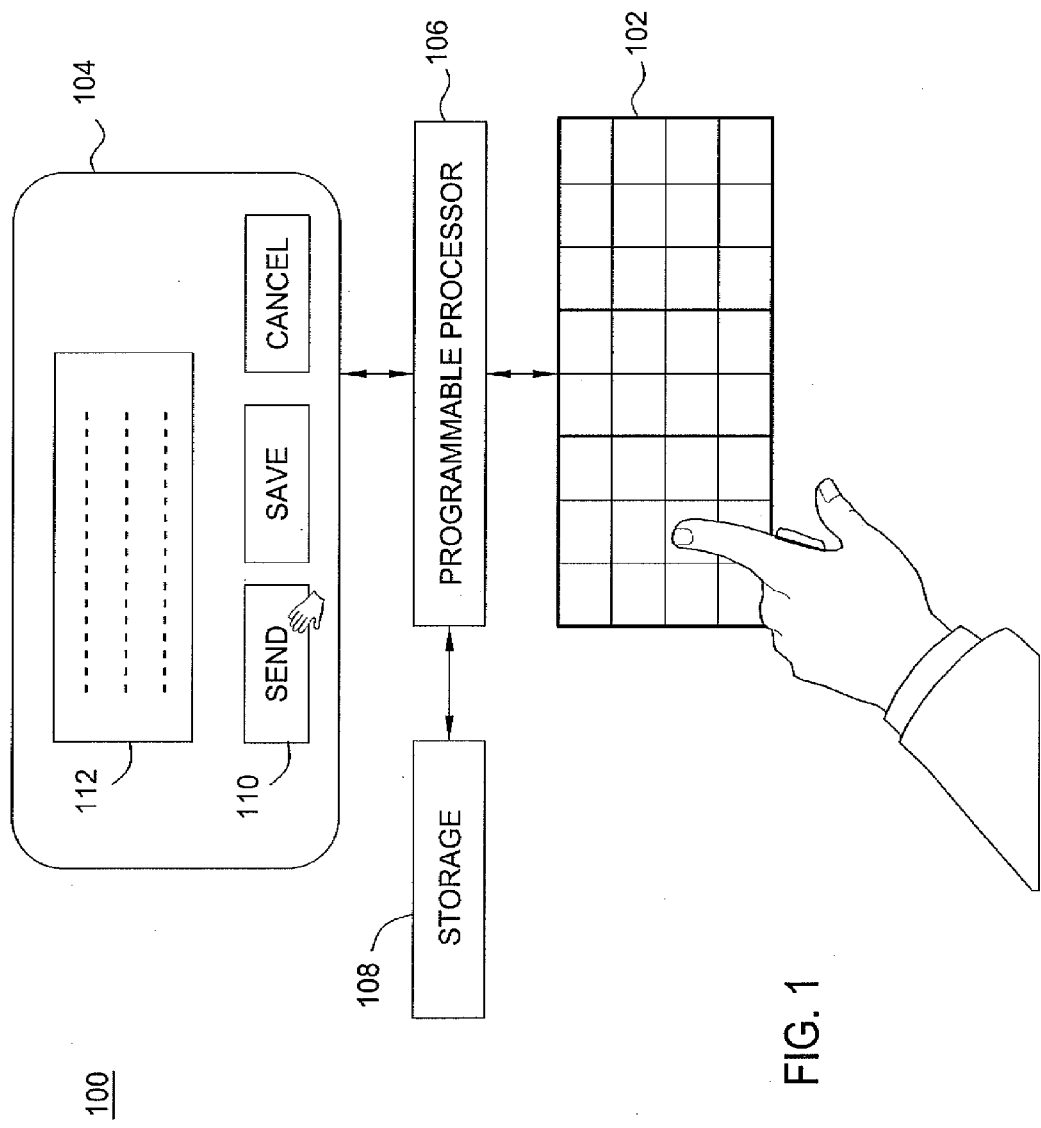
FIG. 1 is a schematic diagram illustrating a computing system with an input device for facilitating interactions between a user and the computing system, according to one embodiment of the present invention.

FIG. 1 is a schematic diagram illustrating one embodiment of an interactive electronic system 100 including a hardware input device 102 for facilitating interactions between a user and the electronic system, according to the present invention. The system 100 may be, for example, a general-purpose personal computer, a tablet computer, a smart-phone or other mobile telephone, a gaming console, a handheld gaming device, a set top box, a television or media player, a computer-controlled machine such as a robot or vehicle, or the like.

In addition to input device 102, the system 100 includes a display 104, a programmable processor 106, and memory storage 108. Processor 106 executes system software for various system-level functions such as control of peripherals e.g. input device 102, display 104, and memory 108, as well as one or more applications including interactive applications (e.g., word processing, email, web browsing, video games, navigation, or the like), the content of which is displayed to the user on display 104. Processor 106, memory 108, and display 104 may each be separate devices communicatively coupled, or may be physically integrated in a single device. Input device 102 is communicatively coupled to processor 106 and transmits input signals based on various forms of manual user input (as described in detail below) for processing and analysis by processor 106 in accordance with system software and the active applications. Additionally, in some embodiments, input device 102 may receive a signal from processor 106, as directed by a current application, to provide haptic feedback (e.g., vibration of the input keys or the like) as output to the user. Memory 108 stores programs and data for use with processor 106.

Input device 102 includes user-manipulated controls for providing input to computing system 100. In a preferred embodiment for many applications, these controls will include a plurality of actuated input elements such as keys or buttons that are pressed by the user to register input, as commonly found on a keyboard or remote control device. In response to such actuation, input device 102 sends a corresponding signal to processor 106, e.g. indicating which key was pressed.

In some embodiments of the present invention, the surface of input device 102 is adaptable, in that the physical shape of the user-manipulated controls on input device 102 can be dynamically modified under control of processor 106. The dynamic rearrangement of actuated input elements allows input device 102 to simulate a plurality of different input devices, literally as needed (this feature of the input device is also referred to herein as "polymorphic", i.e. transformable or adaptable to multiple different shapes). In one embodiment, the polymorphic capability of input device 102 can additionally be used to deliver haptic feedback through rapid vibration. In one embodiment, the actuated input elements of input device 102 include selectively backlit regions. In some embodiments, the actuated input elements are substantially opaque to visible light; in other embodiments they may be transparent.

Input device 102 also includes sensors that detect proximate objects including the user's hands. For example, the sensors may detect the proximity, touch, movement, or applied pressure of an object relative to input device 102. The detected proximity information is transmitted from input device 102 to processor 106. The information detected may be interpreted by programmable processor 106 as an input touch or gesture—such as an interactive selection, or cursor movement, or a swipe, etc.—and presented to a current application. Additionally, by determining the location of a user's extremities (i.e. hands or fingers, or handheld stylus etc.) relative to input device 102, processor 106 can instruct display 104 to visually depict (e.g. as in graphic 110) relevant choices selectable via input device 102 and the location of the user's extremities relative to the input elements of input device 102 that are associated with each of those selectable choices. In one embodiment, visual representation 110 is integrated on display 104 with other visual output 112 of a currently active application, facilitating heads-up interaction by the user with the active application. The user can thus see, without looking away from the display screen, where his or her hands are positioned relative to the relevant input keys or buttons, and what functions or choices are currently assigned to those keys and buttons.

Figure 2:
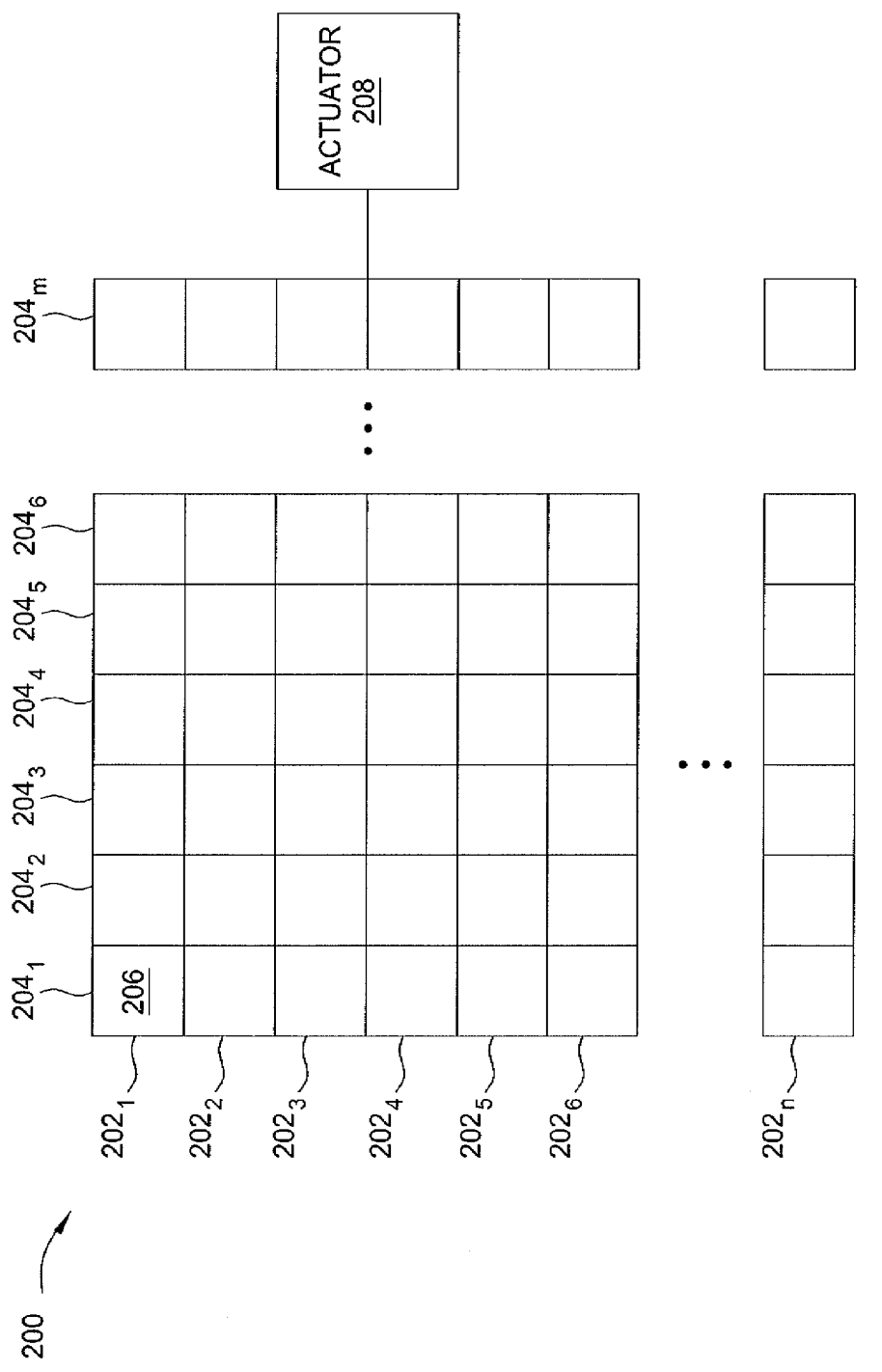
FIG. 2 is a schematic diagram illustrating a top view of an input device comprising an array of grid elements, according to one embodiment of the present invention.

FIG. 2 is a schematic diagram illustrating a top view of a polymorphic input device 102, according to one embodiment of the present invention. In an illustrative embodiment, input device 102 may comprise a three-dimensional array or grid 200 of grid elements, fabricated with e.g. a conventional plastic such as used in the keys and buttons of traditional keyboards and remote controllers. The grid elements include associated sensors, which detect actuation of grid elements and produce a signal (e.g. for processor 106) identifying that a particular element/key has been pressed. The polymorphic embodiment also includes at least one mechanism for dynamically adjusting the elevation of individual grid elements in response to directions from processor 106 of the interactive system 100. A variety of designs are possible for this mechanism, as described below. However, the scope of the present invention should not depend upon or be limited by the particular mechanism(s) employed to control the elevation of grid elements. Input device 102 may be configured in a variety of ways and may be formed from a variety of materials. Thus, FIG. 2 illustrates only one way in which input device 102 may be configured. In some embodiments, the material of the grid elements is preferably penetrable to a radiation (e.g. infrared light) employed by proximity sensors that are also incorporated in device 102 (as described below in connection with FIGS. 3A-3B), but may be opaque or largely opaque with respect to visible light.

In one embodiment, the grid elements are arranged in a plurality of intersecting rows $202_1$-$202_n$ (hereinafter collectively referred to as "rows 202") and columns $204_1$-$204_m$ (hereinafter collectively referred to as "columns 204"). Thus, a grid element is positioned at each intersection of a row 202 and column 204. For ease of illustration, a single grid element 206 is numbered in FIG. 2, at the intersection of row $202_1$ and column $204_1$; however, multiple grid elements are also generally referred to as "grid elements 206" hereinafter.

In some embodiments, an actuator 208 is coupled to grid 200. In some embodiments, actuator 208 is substantially global and is capable of driving a plurality of grid elements 206, while each of the grid elements can be selectively clamped or latched to inhibit or limit its vertical motion. This approach for providing controllable elevation of particular grid elements is analogous to the approach described at length in co-pending U.S. patent application Ser. No. 13/158,122 entitled Adaptable Input/Output Device, incorporated herein by this reference. In one such embodiment, actuator 208 drives substantially all of the grid elements 206. In another variation, a plurality of actuators 208 is deployed, such that each actuator 208 drives a particular localized region or group of grid elements 206m such as a row or column of the grid 200. For example, each row 202 or each column 204 may be driven by a dedicated actuator 208. In an alternative embodiment, a dedicated individual actuator 208 is used to drive each individual grid element 206, in which case selective clamping may be less relevant.

Each grid element 206 is capable of being vertically displaced or elevated by its associated actuator 208, for example using air pressure or electromechanical actuation (such as a solenoid). Thus, the actuator 208 drives the grid elements 206 in a direction that is substantially normal to the interaction surface of input device 102. For simplicity's sake, the actuator or reset mechanism is not illustrated in these Figures.

Figures 3A, 3B:
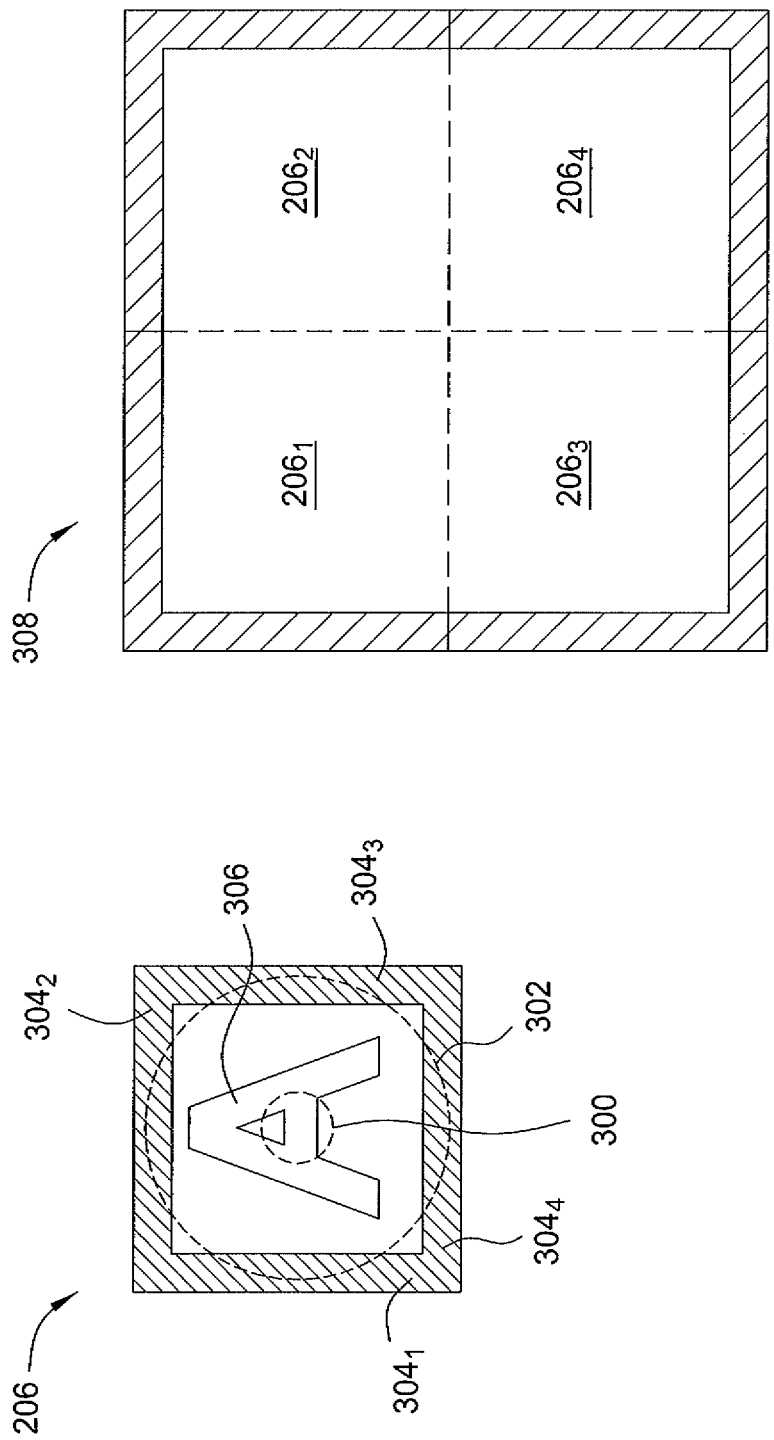
FIG. 3A is a top view of a grid element, according to one embodiment of the present invention.
FIG. 3B is a top view of a large grid element formed from a plurality of smaller grid elements, according to one embodiment of the present invention.

FIG. 3A is a top view of one embodiment of a grid element 206, according to the present invention. In an illustrative embodiment, the grid element is substantially rectangular in shape. As discussed above, one embodiment of the grid element 206 is substantially opaque to visible light; however, portions of the grid element 206 may comprise substantially transparent material that is selectively backlit. For example, in one embodiment, at least a portion of the grid element's perimeter (e.g., one or more sides or edges) is substantially transparent. In an alternative embodiment, more of grid element 206 is substantially transparent.

In the illustrated embodiment, the grid element's edges $304_1$-$304_4$ (hereinafter collectively referred to as "edges 304") are formed of a substantially transparent material. Edges 304 may be selectively backlit when the grid element 206 is activated in conjunction with one or more adjacent grid elements (e.g., by laterally latching the grid element 206 to the adjacent grid elements using a latching mechanism) to form a larger composite grid element, with backlighting of those edges 304 that define the perimeter of the larger composite element. For instance, the edges $304_1$ and $304_2$ of the grid element 206 may be backlit to form the top left corner of a larger grid element, as illustrated in FIG. 3B, which is a top view of a large grid element 308 that is formed from a plurality of smaller grid elements $206_1$-$206_4$. In such an embodiment, some of the edges of the smaller grid elements $206_1$-$206_4$ are backlit (in the same color) to outline the perimeter of the large grid element 308.

The color of the backlighting may vary by context of use, such as to visually identify a current input function associated with the grid element, as discussed in more detail below.

In one embodiment, the grid element 206 displays a character or image 306 on its surface. For instance, in the illustration of FIG. 3A, the grid element 206 displays the capital letter "A"; in one embodiment, each one of several grid elements would display a different label, corresponding e.g. to the keys on a typical alphanumeric keyboard. In one embodiment, the character or image 306 is formed of a substantially transparent material (on a substantially opaque grid element 206) that is backlit e.g. when the grid element functions as an "A" key. (In an alternative embodiment, the character or image 306 is formed of a substantially opaque material on a substantially transparent grid element 206.) The character or image 306 allows the grid element 206 to be visually identified and used as an alphanumeric key, for instance, when input device 102 is configured as an alphanumeric keyboard (in which case, the character or image 306 is backlit). Whenever input device 102 is reconfigured as an alternative input device that does not require alphanumeric keys, the character or image 306 is not backlit (so that the character or image is substantially invisible).

FIG. 3A also depicts a sensor 300 integrated with grid element 206, apart from the sensor described earlier to detect actuation of grid element 206. In one embodiment, sensor 300 is a proximity detector that detects the proximity of an object (such as the user's hand) relative to grid element 206, within a threshold range. In one such embodiment, the sensor's detection range 302 is approximately as big as the grid element 206. In another embodiment, sensor 300 is or comprises a pressure sensor that detects when the object touches or applies a pressure to the grid element 206. In other embodiments, sensor 300 detects any combination of: proximity, touch, or applied pressure. Collectively, sensors 300—in conjunction with processor 106 (which analyzes the sensor data)—can preferably observe and track a plurality of actions and movements with respect to input device 102, including the user's hand position and gestures. Suitable algorithms for recognizing gestures and the like are familiar to those of skill in the art, and processor 106 can readily be programmed accordingly.

The association of sensor 300 with a single grid element 206 is by way of illustration. In other embodiments, multiple sensors may be integrated or associated with a single grid element, and vice-versa.

In some embodiments, one or more of sensors 300 and one or more of grid elements 206 are "co-located." Herein, a sensor is generally referred to as being co-located with an input element if the sensor (or a portion of it) is located inside the input element or vertically above or below the input element (where "vertical" means the direction normal to the relevant input surface with which the user interacts). In some embodiments, the proximity sensors can penetrate the opaque plastic or similar material used in keyboard-style keys and/or buttons, such as by employing infrared-based detection. The proximity sensors can thus be advantageously co-located with such keys and/or buttons, such as by being placed underneath or inside the keys/buttons, without competing for scarce real estate on the surface of the input device. Commercially available sensors include Silicon Labs' QuickSense™ infrared proximity sensors, see e.g.: http://www.silabs.com/products/sensors/infraredsensors/Pages/Si1102.aspx and http://www.youtube.com/viralsilabs#p/a/u/0/qznlwbCVQ1c.

Moreover, in further embodiments, co-located proximity sensors 300 allow for manual user control of concurrent, multiple on-screen cursors or selectors. That is, each of the user's fingers or extremities can be individually detected by the plurality of sensors 300, and the tracked position and/or movement of each finger or extremity can represent user input for control of a corresponding on-screen cursor, or for selection of a corresponding on-screen user choice. By way of illustration and as just one example, a user might use fingers of their right hand to control a cursor and select text within a displayed document, while concurrently using fingers of their left hand to select one or more desired operations with respect to that text (e.g., italicizing or otherwise changing the style of the text within a word processing application). In contrast, use of a standard keyboard-plus-separate-cursor-control input device would often entail lifting and displacement of the user's hand in multiple locations in a series of sequential manual steps.

Figure 4:
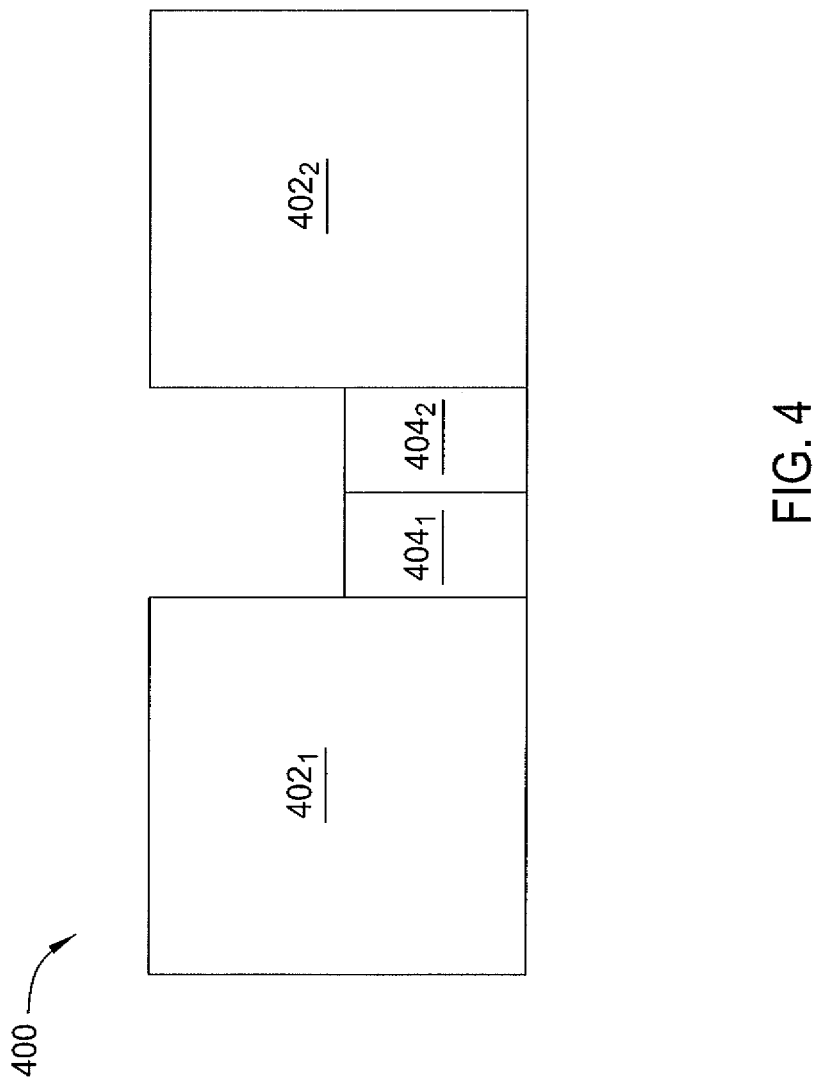
FIG. 4 is a side view of a portion of an input device comprising two types of grid elements, according to one embodiment of the present invention.

FIG. 4 is a side view illustrating a portion of an array 400 of grid elements that comprises two types of grid elements, according to embodiments of the present invention. In particular, the array 400 comprises a plurality of primary grid elements (two of which are illustrated as primary grid elements $402_1$-$402_2$, hereinafter collectively referred to as "primary grid elements 402") and a plurality of secondary grid elements (two of which are illustrated as secondary grid elements $404_1$-$404_2$, hereinafter collectively referred to as "secondary grid elements 404").

Both primary grid elements 402 and secondary grid elements 404 are configured in a manner similar to grid element 206 illustrated in FIG. 3, i.e. both can be automatically elevated or lowered under control of processor 106. Primary grid elements serve as the manipulable input controls for input device 102. Thus, for example, in a preferred embodiment the primary grid elements constitute keys or buttons that, when pressed or actuated by a user, transmit a corresponding input signal to processor 106. Secondary grid elements 404, on the other hand, do not generate an input signal when pressed, and instead preferably serve to fill the small gaps or spaces between the primary grid elements. In this way, the grid as a whole can be dynamically reconfigured—as and when needed—for example by positioning secondary grid elements 404 at a substantially lower elevation than primary grid elements 402 (as depicted in FIG. 4) in order to match the look and feel of a conventional keyboard with spacing between keys, or by positioning secondary grid elements 404 at substantially the same elevation as primary grid elements 402 in order to match the look and feel of a flat, smooth touchpad.

Generally, the grid elements of FIG. 2 and FIG. 4 are not co-located with the display screen of display 104, and hence do not necessarily need to be transparent to visible light or otherwise compatible with display of visual output within a shared surface area.

In some embodiments, the grid elements may be vibrated—rapidly elevated and lowered—so as to produce haptic feedback. For instance, vibration might be used to alert a user regarding an input selection with potentially disturbing consequences; as another example, the rate of vibration may be increased or decreased to represent an increase or decrease in a corresponding input parameter being controlled as the user slides or moves his finger along a portion of the input surface. (The latter example is described further below in connection with FIG. 6.)

In other embodiments, elevation of the grid elements may be manually controlled by the user in the manner of e.g. a traditional keyboard—i.e. processor 106 may not necessarily be able to raise or lower the elevation—but dynamic clamping of the grid elements by processor 106 in a raised position still allows dynamic configuration of device 102 or a portion thereof as a flat touch pad. In still other embodiments, even dynamic clamping under processor control may not be provided, and the surface of input device 102 can still function as a touch pad; the input elements (keys) may yield to pressure, but such actuation may be ignored or treated differently by processor 106 while in a touch input mode of operation (see below in connection with FIG. 7).

Figure 5:
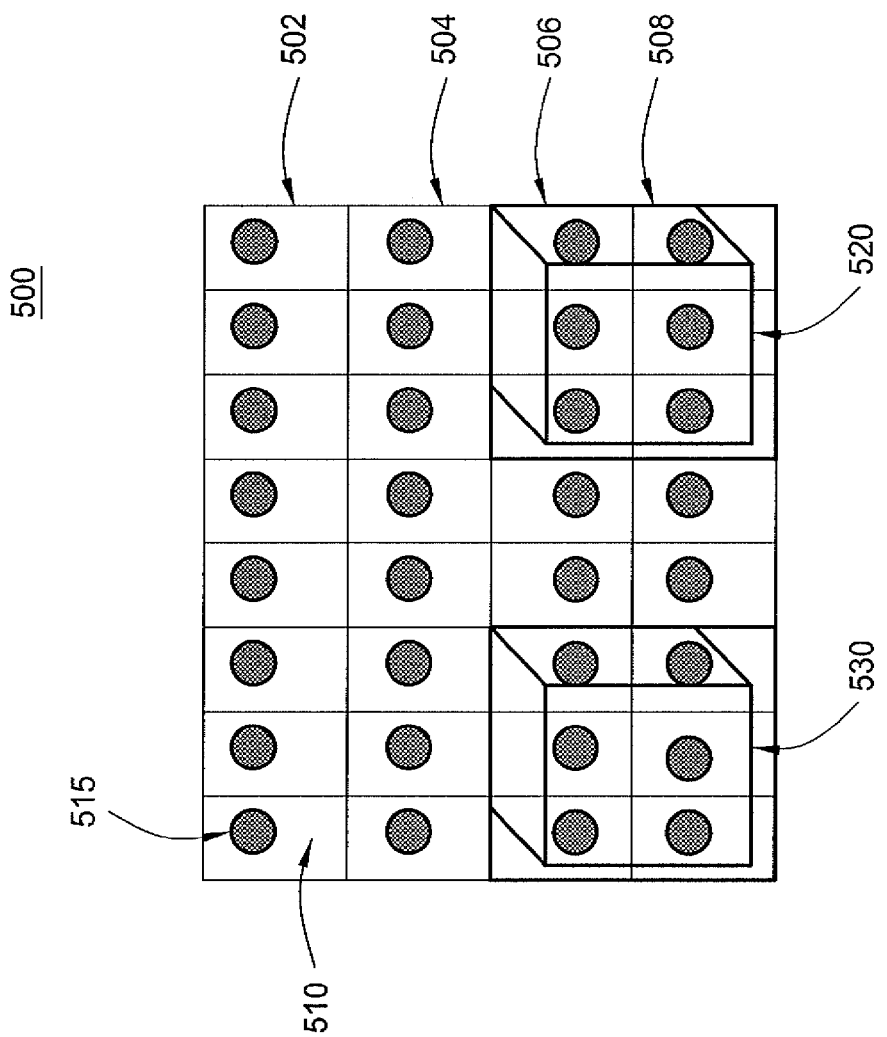
FIG. 5 illustrates an exemplary set of grid elements configured to simulate a customized keypad.

FIG. 5 is a view looking down on a simplified depiction of polymorphic keyboard 500 in a further embodiment of the present invention. The illustration shows a grid having 8 columns by 4 rows of grid elements. For simplicity, in this example, each of the grid elements (exemplified by element 510) is a primary grid element representing a key that can be actuated (pressed) by the user to register input, and also contains a co-located proximity sensor 515. In a present configuration of the keyboard, two blocks of grid elements 520 and 530 spanning rows 506 and 508 of the grid are shown, in which the respective grid elements of each block have been latched together as a group by the system and are elevated at a level above other keys (grid elements) on the keyboard. Block 520 consists of the three right-most grid elements in rows 506 and 508, while block 530 consists of three left-most grid elements in those same rows. This particular configuration is just one arbitrary example, but has been shown in order to illustrate the potential to reconfigure a typical keyboard having several dozen small individual keys into a customized keypad with a relatively small number of large input blocks/pads that are easier to manipulate.

Figure 6:
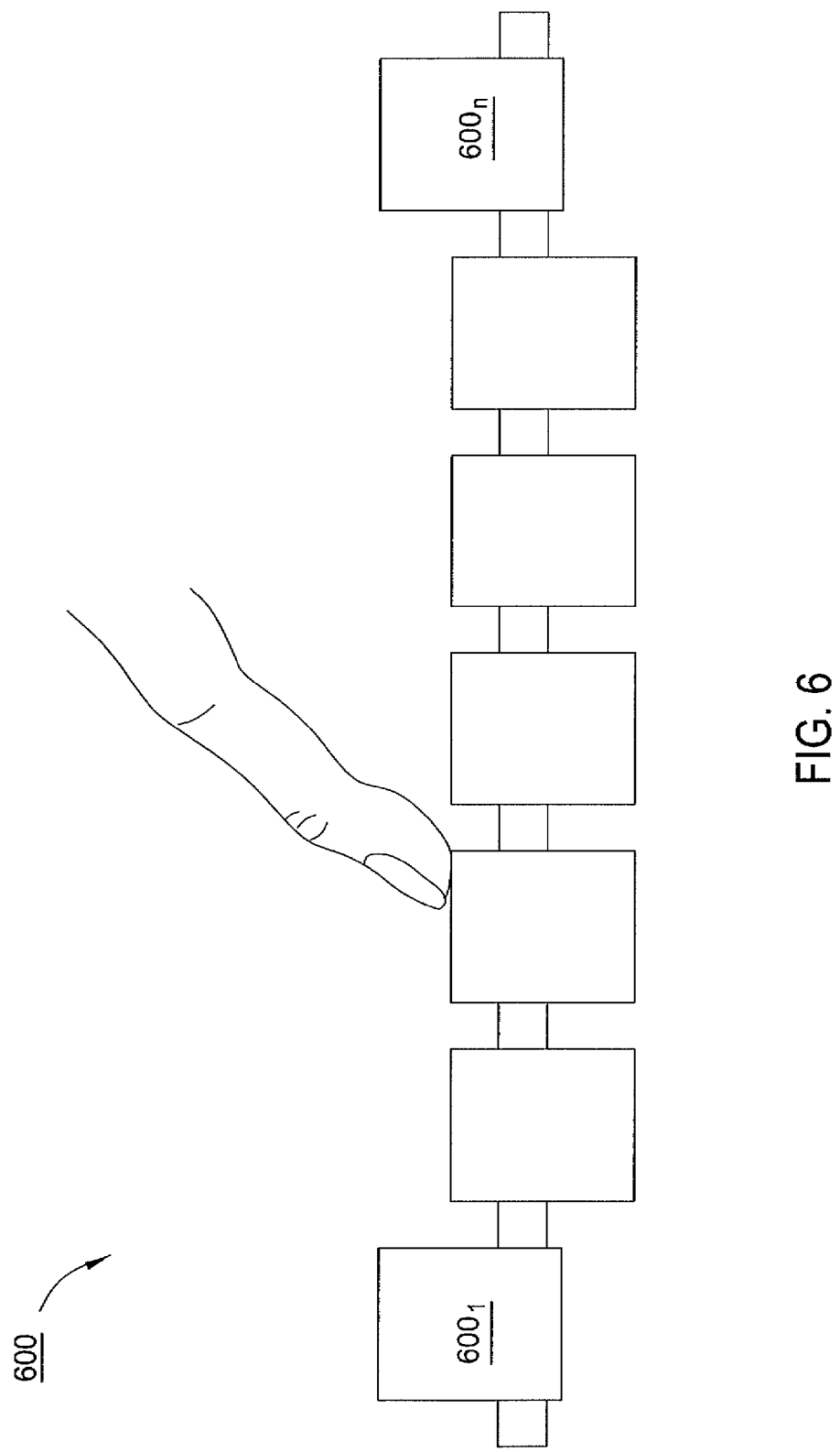
FIG. 6 illustrates an exemplary set of grid elements configured to simulate an interactive slider.

As a further example of the type of input devices that can be simulated by the hardware device 102, FIG. 6 illustrates an exemplary set 600 of grid elements that is configured to simulate a slider, scroll bar, or the like. A slider is a familiar user input instrumentality, allowing a user to increase or decrease an input parameter value for a computing system by sliding or dragging a corresponding indicator on the slider. Conventionally, a slider is displayed on-screen, and the user manipulates the slider to select a desired value by maneuvering a cursor (with a cursor-control device such as a mouse)

into position over the slider, or else by means of touch-screen input if available. However, in one embodiment of the present invention, illustrated in FIG. 6, a portion of user input device 102—shown as a set of grid elements 600—can itself be dynamically reconfigured by system 100 to physically embody a slider when and as needed. The user simply slides his/her finger across the surface of grid elements 600 to select a desired value within the applicable range of the slider.

Boundary grid elements $600_1$ and $600_n$ are shown clamped at a relatively higher elevation than the other elements in set 600 so that the user will not easily slide past them—even if the user is looking up at the screen—thus providing tactile feedback to define the upper and lower edges of the slider. Although the drawing shows small spaces between each of the grid elements, in many embodiments there would be no such spaces—for example, because spaces are filled by secondary grid elements (such as elements 404 described above in connection with FIG. 4), or because the grid elements 600 are positioned without any intermediate spacing. Additionally, in further embodiments, display 104 displays a graphical representation of the slider, its value range, and the current selection/location of the user's finger within that range. (The foregoing thus provides one example of how an embodiment of the present invention can facilitate "heads-up" interaction with system 100; see below in connection with FIG. 8.) In a further variation, grid elements 600 are controlled by processor 106 so as to provide haptic feedback corresponding to a currently selected input value. For example, grid elements may vibrate at an increased or decreased rate corresponding to an increase or decrease in input value as the user slides their finger across the slider. (Alternatively, other tactile feedback, such as varying resistance to pressure, may be provided.)

The foregoing arrangements of input device 102 described in connection with FIG. 5 and FIG. 6, which can be dynamically configured as needed in accordance with the present invention, are just two illustrative examples of the wide range of alternative input device types that can be provided on demand in response to the needs of whatever application the user is currently interacting with. Further examples of yet other types of manipulable input devices that can be simulated as needed by a polymorphic input surface are described in the above-referenced and incorporated pending U.S. patent application, Adaptable Input/Output Device.

In some embodiments, when grid elements have been reconfigured to function as a touch pad, slider, or other touch-driven input facility, other grid elements or other input elements of input device 102 may still be maintained in a normal actuation configuration, for example to provide a user-manipulated facility to register selection (similar to e.g. "clicking") if needed. Alternatively, limited actuation/pressing may be allowed responsive to sufficient user pressure, as a "clicking"-style selection mechanism with feedback.

In yet another embodiment, processor 106 can adjust the elevation and/or clamping of any grid elements of input device 102, if not currently needed or dedicated to serve as input controls, in a manner that enhances the ergonomics of input device 102, such as by creating ridges, palm rests, finger rests, or other ergonomically desirable contours.

It should be noted that the present invention is not limited to polymorphic embodiments of input device 102. Other embodiments of the present invention may be implemented using non-polymorphic input devices, such as traditional keyboards or keypads with integrated proximity sensors and/or in accordance with other aspects of the invention disclosed herein.

Figure 7:
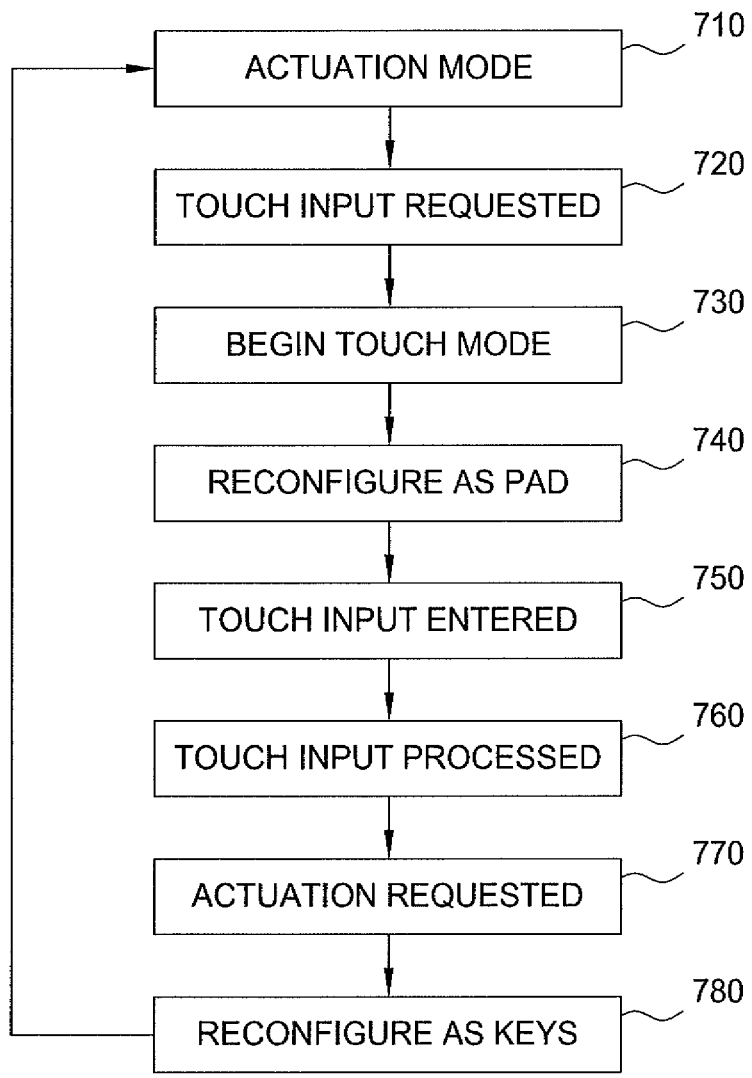
FIG. 7 is a flow diagram illustrating a method for interacting with a computing system using a polymorphic input device, according to one embodiment of the present invention.

FIG. 7 is a flow diagram illustrating a method 700 for a user of an input device, such as hardware input device 102, to interact with system 100, according to one embodiment of the present invention. As such, reference is made in the discussion of the method 700 to various elements of input device 102 and system 100. It will be appreciated, however, that method 700 (and likewise methods 800 and 900, described below) may also be implemented using devices having configurations that differ from those exemplified in the foregoing figures.

Method 700 begins at step 710 as the user interacts with system 100 in an actuation input mode, e.g., by using hardware input device 102 as a keyboard and typing or pressing its keys. Method 700 begins in actuation mode arbitrarily and purely for illustrative purposes. As will shortly be clear, method 700 facilitates switching back-and-forth between actuation input mode and a touch/gesture input mode; as such, an embodiment of this method can equally well begin in touch input mode, for example, at step 750 below, and then cycle back to actuation mode when desired.

At step 720, system 100 receives signals that are interpreted as a request for touch input to be entered. These signals could, for example, be received via sensors 300 of input device 102 and be recognized by processor 106 as a user gesture (e.g., resting the user's hands on or above the keyboard of input device 102 for more than a given minimum period of time, or any other suitable gesture) that by convention indicates a user's desire to enter touch input; the signals could also take other forms of user, input, such as a typed or spoken (in an embodiment of system 100 with voice recognition capability) request to enter touch input, or based on the user's gaze (in an embodiment with gaze tracking). Alternatively or in addition, the signals might be generated by a software application executing on system 100, based on the nature of interactive input required or expected by the application in a current context, or on some other basis.

At step 730, in response to the request of step 720, system 100 determines to begin facilitating user input via input device 102 in a touch mode. To achieve this, at step 740 input device 102 is dynamically reconfigured to better simulate a touch pad, by adjusting the elevation of the grid elements (including secondary grid elements, in embodiments of the type described above in connection with FIG. 4) to a uniform level, and preferably clamping them at that level (and/or using actuation pressure to maintain that level) so as to resist at least moderate user pressure. In this configuration, at step 750 the user can touch and smoothly slide or swipe his fingers across the surface. In step 760, these touches and movements are detected and tracked by proximity sensors integrated in the grid (e.g. sensors 300 as shown in FIG. 3A) and the input is analyzed and processed by processor 106.

At step 770, system 100 receives signals that are interpreted as a request for actuation input to be entered. Analogously to the touch input request of step 720, such signals could, for example, be received via sensors 300 of input device 102 and be recognized by processor 106 as a user gesture (e.g., placing the user's figures in a typing position on or above the keyboard of input device 102 for a threshold period of time, or any other suitable gesture) that by convention indicates a user's desire to enter actuation input; or could take the form of spoken or other user input in suitable embodiments; or might be generated by a software application executing on system 100 based on the nature of interactive input required or expected by the application in a current context; or may represent a combination of several of the foregoing signals and/or other input.

At step 780, in response to the request of step 770, system 100 determines to facilitate user input via input device 102 in an actuation mode, and therefore dynamically reconfigures input device 102 by adjusting and/or unlocking/unclamping the elevations of the grid elements so as to restore the initial keyboard configuration of method 700. Flow within the method thus returns at this point to step 710. As desired by the user and/or as dictated by the interactive context of a currently executing application, system 100 can continue to dynamically cycle back-and-forth between actuation and touch configurations for input device 102 on an on-demand basis.

Figure 8:
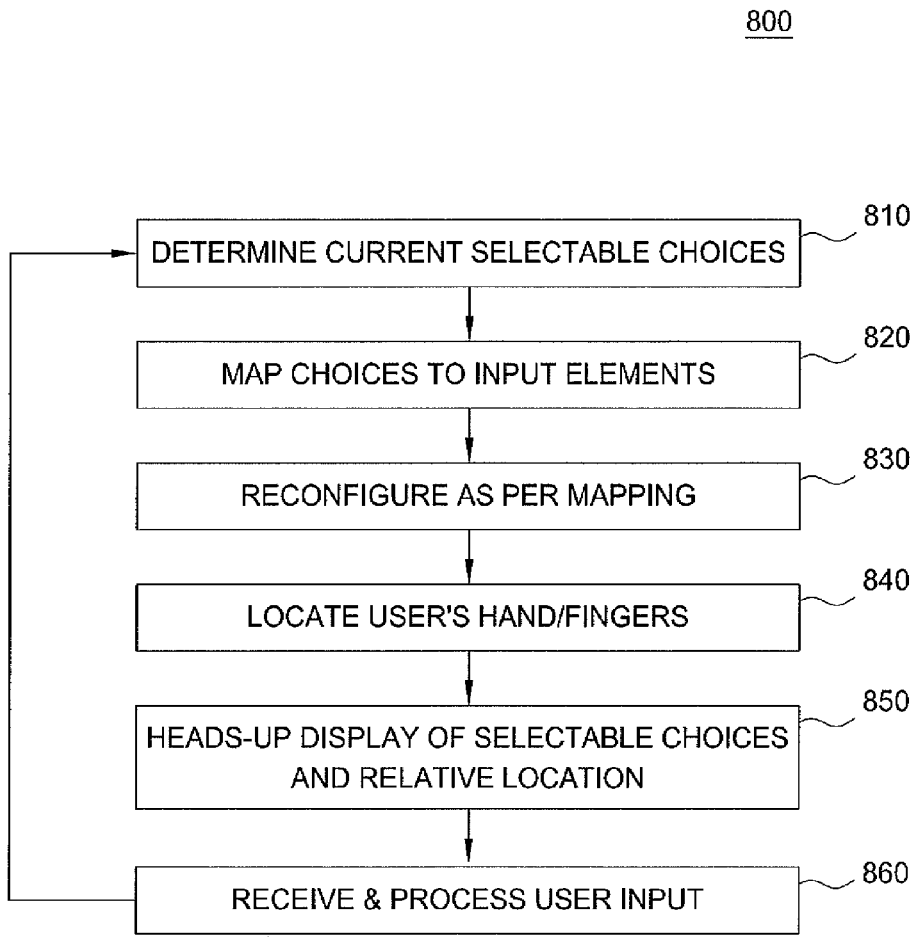
FIG. 8 is a flow diagram illustrating a method for interacting with a computing system in a "heads-up" manner, according to one embodiment of the present invention.

Referring now to FIG. 8, method 800 begins at step 810, in which programmable processor 106 determines a current set of alternative choices from which a user is expected to select. The set of choices may be defined, for example, by a software application currently executing on processor 106. By way of simple illustration, if an email application is currently executing, and the user has composed a message, then applicable choices may include "send", "save" and "cancel". Next, in step 820, processor 106 maps those choices to input elements on device 102, i.e., each selectable choice is associated with a corresponding input element or block of input elements on input device 102.

In step 830, processor 106 directs a reconfiguring of input device 102 in accordance with the mapping assigned in step 820. For instance, in the example given above, since there are three likely applicable choices—send, save, and cancel— three groups or blocks of input elements are designated on input device 102 in step 820, and in step 830 the input elements belonging to each block are latched together and elevated to a common level. In some embodiments, spaces between the elements in each group are filled in by similarly elevating the appropriate secondary grid elements to the same level. In some embodiments, the element edges surrounding the perimeter of each group are also backlit to visually highlight each group, as described above in connection with FIG. 3.

In step 840, processor 106 notes the location of the user's hands or fingers on or near input device 102, based on input from sensors 300. In some embodiments, as described earlier, sensors 300 continually track the location of nearby objects such as the user's hands and transmit that data to processor 106. The present description is not meant to imply that the user's hands are only located at this point in the process, but simply that at this point it is necessary for processor 106 to retrieve and to utilize the current location information. In step 850, display 104 (under control of processor 106) displays a visual depiction of the current selectable choices—in our example, send, save and cancel—in a manner that is spatially consistent with the arrangement of the corresponding blocks on input device 102, exemplified in graphic 110 of FIG. 1. In other words, if for example the three blocks are arranged side by side on input device 102, corresponding to send, save and cancel respectively from left to right, then boxes labeled "send", "save" and "cancel" will similarly be displayed from left to right in a portion of the screen by display 104. In addition, display 104 will also visually represent the location of the user's hand or fingers relative to the input blocks, such as by displaying a visual (e.g. iconic) representation of the user's hand or fingers on the screen in a corresponding location relative to the displayed boxes, or by simply highlighting a box if the user's hand is positioned on or directly above that box. In this way, the user can advantageously determine with confidence how to position his hand or finger on the correct input block of device 102 for his desired choice, while continuing to maintain heads-up focus on display 104.

In a further variation, each of the input blocks (and the corresponding on-screen boxes) may be associated with a list of additional choices or functions, besides the currently assigned choice. In response to a suitable signal—for example, if the user's hand hovers above (or, in some embodiments, touches but does not press) a particular input block— processor 106 begins to cycle through the list of additional choices one at a time, and instructs display 104 to similarly cycle its visual identification of the displayed box accordingly. In this way, a relatively small number of comfortably-sized input blocks can provide interactive access to a relatively larger number of possible functions or choices.

In step 860, the user selects a choice by pressing the input block on device 102 that corresponds to the desired choice. In response to actuation of that input block, the selection is communicated to processor 106 for processing in accordance with the executing application. For example, in our earlier example, if the block corresponding to "save" was pressed, then the composed email is saved to persistent memory storage by system 100. At any rate, flow of control in method 800 next returns to the beginning of the process at step 810, until processor 106 determines a new, current set of applicable choices.

In embodiments where the perimeter of each of the input blocks is backlit or otherwise highlighted in a distinctive color at step 830, the corresponding box on the screen of display 104 is preferably displayed in the same color in step 850.

In a variation of method 800, step 840 is performed prior to steps 820-830 and influences those steps. Thus, processor 106 determines a current location of the user's hands or fingers relative to input device 102, and then maps the selectable choices to input blocks that are formed and positioned as conveniently as possible for the user. Where a number of multiple choices are available for selection, in some embodiments programmable processor 106 may predict a most likely selection (e.g. based on the user's usage history, or based on known statistics for general usage) and assign it to a key or block nearest the user's fingers. Thus, input keys, buttons or blocks that are likely to be pressed come to the user, instead of the user having to move his hands or fingers over to a particular key or button in a predetermined position.

Methods 700 and 800 have been described for illustrative purposes with reference to exemplary interactions, but can also be used in accordance with the present invention to facilitate a wide variety of interactions. Purely by way of example, these and other methods in accordance with various embodiments of the present invention may advantageously be used to facilitate interactions including: interaction with an electronic message, playing a video game, controlling a media player, controlling a vehicle or robot, playing or emulating a musical instrument (e.g., a piano), or editing a document, drawing, or image; and each of the foregoing, for example, may be in the context of a single-user application, or a collaborative application in which the user interacts with other locally present and/or remote users. Heads up interaction, such as described e.g. in connection with method 800, can be efficient in many interactive applications and may be especially valuable in real-time, highly visual applications such as playing video games, media, or a (computer-emulated) musical instrument.

Practitioners will recognize that methods 700 and 800 can also be usefully combined in various ways depending on application and context, all in accordance with the present invention. For example, input device 102 can function as a standard keyboard when that is appropriate to the user's interaction context (e.g., authoring a written document); function as a touchpad with proximity detection when that is most appropriate to the user's context (e.g., drawing, gesturing); and function as a customized input pad with support for heads-up interaction when that is most convenient (e.g., selecting from a few relevant choices; scrolling). Input device 102 can be dynamically and repeatedly switched back-and-forth among these and other configurations, all as needed in response to the user's evolving contexts.

In one embodiment, processor 106 executes a software application interaction extension framework to install plugins that allow legacy applications to take advantage of methods for dynamically reconfiguring input device 102 and for supporting heads-up interaction in accordance with the present invention, such as discussed above in connection with methods 700 and 800. Legacy software applications can thus be extended simply by creating a suitable plugin, rather than by rewriting the application, in order to benefit from the present invention. In other embodiments, applications may be written (or rewritten) specifically designed for use with the present invention.

Figure 9:
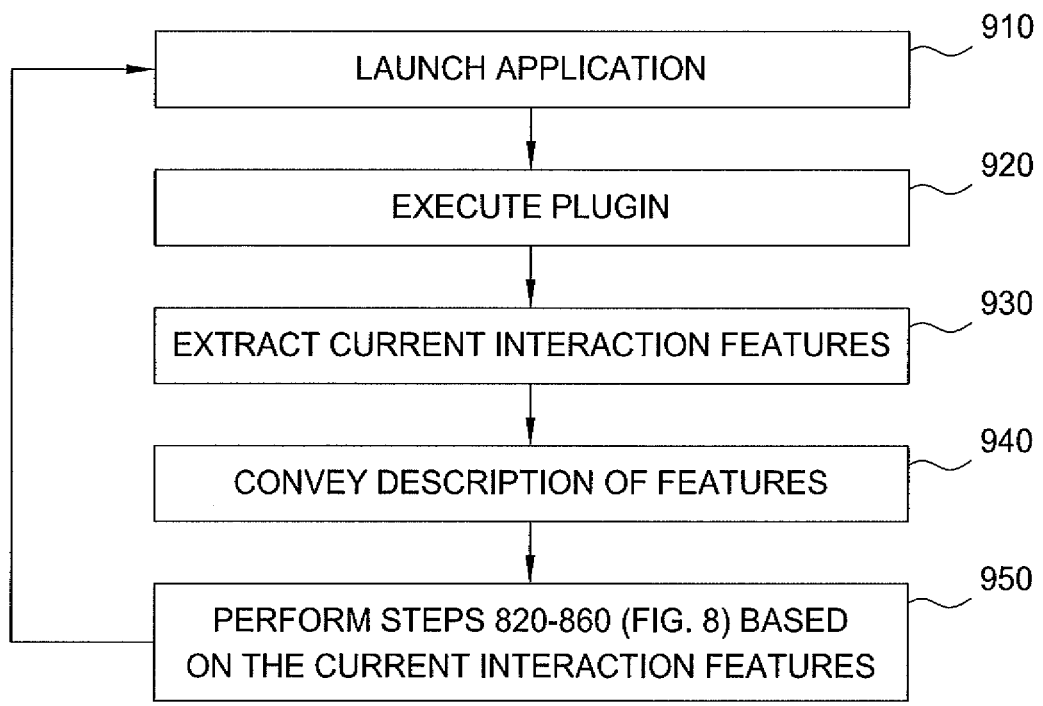
FIG. 9 illustrates a wireless remote controller according to one embodiment of the present invention.

FIG. 9 is a flow diagram illustrating one embodiment of a method 900 for facilitating a heads-up interaction between a computing system and a user via a dynamically configurable interaction surface (e.g., input device 102), according to the present invention and utilizing a software application interaction extension framework. Method 900 may be executed, for example, on processor 106 and system 100 illustrated in FIG. 1.

At step 910, an interactive application is launched for execution on processor 106. At step 920, processor 106 extends the detected application by running an associated plugin. The plugin can be authored based on the interactive features of the application, as practitioners will recognize, and does not require rewriting of the application itself. A function of the plugin, performed in steps 930-940, is to identify currently relevant interactive features (e.g., input requirements) of the application during execution, and to convey that information to processor 106. (in some embodiments, the plug-in may identify and include additional new interactive features that are useful with respect to the legacy application, even if such new features were not supported in an interactive manner by the original legacy application itself.) In that way, processor 106 can determine a mapping of applicable choices or other relevant input features to input controls on device 102, reconfigure device 102, determine a visual representation for display 104, and otherwise perform the steps discussed above in connection with method 800 (summarized here as step 950). Note that when the user's input selection is received, corresponding to step 860 of method 800, an appropriate identification of that choice is returned to the legacy application, as instructed (at least in part) by the plug-in. The method continues in this manner for a given legacy application until execution of that application terminates.

In further embodiments of the present invention, input device 102 may be integrated in a wireless handheld remote control or similar device, such as a remote control unit for a television or other media player, or a wireless video game controller. In such applications, heads-up interaction is often valuable, and methods along the lines illustrated in FIG. 8 can thus be advantageously employed. For example, if proximity sensors are integrated in a wireless game controller, then in accordance with the present invention, the game console processor can receive and process the sensed proximity data, determine current location of the gamer's fingers, and generate on-screen display insets that visually represent currently applicable choices for the gamer and are spatially arranged and/or color coded to match the actual buttons on the device, along with a representation of where the user's active fingers are currently located relative to those buttons. Likewise, proximity sensors can be advantageously integrated in or beneath the buttons on a television remote control in accordance with the present invention. Functions of probable current interest to the user (e.g. volume, channel selection) can be visually represented on-screen, with a depiction of the user's fingers, in a manner spatially consistent with the relative location of corresponding buttons on the remote control and a current positioning of the user's fingers.

In some embodiments, the wireless remote controller incorporates one or more inertial sensors such as an accelerometer and/or gyroscope, so that movement of the device (e.g., tipping upward, downward, or to the side, waving in a cyclical pattern, etc.) is detected. In one such embodiment, the inertial sensors sense a current orientation of the wireless remote in space. In one embodiment, this movement and/or orientation data is transmitted to processor 106 of system 100 being controlled, and can be treated as an additional user input argument, e.g. to intensify the current command. For example, if the user is currently using the remote controller to increase (or decrease) a parameter of display 104 such as volume, brightness, or contrast, the movement or orientation data (e.g. a pronounced upward tilt of the device) can be interpreted by processor 106 to more rapidly adjust the display. Similarly, tilting the device can be treated as an intensifier in connection with a current command to fast forward or rewind through recorded media content, to progress through a series of channels, to advance through a series of screens, or to scroll through a lengthy menu list. In some embodiments, tilting the device in an opposite direction may similarly serve as a de-intensifier or de-accelerator with respect to the current command.

In some embodiments of input device 102 as a wireless remote controller, the device is not necessarily polymorphic, i.e., the physical arrangement of buttons and the like may be fixed and predetermined, as in conventional controllers. Nevertheless, the integration of proximity sensors can facilitate heads-up interaction in accordance with the present invention. For example, with reference to FIG. 8, step 830 is inapplicable—because the buttons etc. are in a fixed arrangement—but the method can otherwise be usefully applied, as described in the preceding paragraph. In embodiments where the wireless remote controller is polymorphic, buttons on the remote can be dynamically reconfigured as best suits the user's current context (e.g., as a smaller number of larger, easier-to-manipulate buttons).

In some embodiments, aspects of method 800 in accordance with the present invention can be employed to facilitate heads-up interaction while using a mobile phone, tablet, or other wireless device with an integrated touch-screen that is adapted for use as a remote controller. (For example, existing apps are commercially available that will adapt a typical smart-phone or tablet computer to serve as a television or media player remote controller, such as: DVR Remote, available on iTunes for using an iPhone to control a Tivo DVR; and Google TV Remote, with versions for both Android and Apple iOS devices). For example, FIG. 10 illustrates a mobile phone 1000 serving as a remote control for a device such as television 1002. The touch screen of mobile phone 1000 is shown as displaying a set of controls 1004 for applicable media input commands in the context of viewing a recorded movie (e.g. from DVR) such as play, stop, pause, fast forward, rewind, and the like. In accordance with the present invention, a matching set of controls 1006 is also displayed on the screen of television 1002, along with a depiction of a currently detected position of the user's fingers relative to the corresponding controls 1004. In one embodiment, the layout and border colors of these buttons are the same in both the set of controls 1004 and the set of controls 1006. In a further embodiment, the controls in set 1004 that are used most frequently in a given context may be made larger, positioned more centrally, or otherwise made more easily selected relative to the less frequently used controls.

One or more steps of the methods described herein may include a storing, displaying and/or outputting step as required for a particular application, even if not explicitly specified herein. In other words, any data, records, fields, and/or intermediate results discussed in the methods can be stored, displayed, and/or output to another device as required for a particular application.

Although various embodiments which incorporate the teachings of the present invention have been shown and described in detail herein, those skilled in the art can readily devise many other varied embodiments that still incorporate these teachings.

What is claimed is:

1. A method for facilitating an interaction between an electronic system and a user in accordance with a legacy software application, the electronic system comprising a computing system and an input device, the computing system comprises of the legacy software application, a display, a processor, and one or more sensors for detecting a present object, and the input device comprises of a plurality of user-manipulated input controls, the method comprising:
    executing the legacy application with the processor;
    executing a supplemental software program with the processor, to identify a plurality of interactive features for the legacy application;
    dynamically assigning functionality to the plurality of user-manipulated input controls based on the plurality of identified interactive features;
    displaying a visual depiction of the assigned functionality on the display of the computing system;
    receiving an input from the user via one or more of the user-manipulated input controls;
    processing the input at least partly by the supplemental software program; and
    providing a result of said processing to the legacy application
    wherein the functionality assigned to any given one of the plurality of user-manipulated input controls varies dynamically depending upon whether the one or more sensors detect an object proximate to the given one of the plurality of user-manipulated controls,
    wherein the plurality of identified interactive features includes at least one feature that does not correspond to an interactive feature provided by the legacy application, and
    wherein the supplemental software program is a plugin.

2. The method of claim 1, wherein the detected object is an extremity of the user.

3. The method of claim 2, further comprising tracking a current position concurrently for each one of a plurality of user extremities.

4. The method of claim 1, wherein the visual depiction of the assigned functionality reflects a spatial layout of corresponding ones of the plurality of user-manipulated input controls.

5. The method of claim 1 wherein the visual depiction further depicts a location of the object relative to the plurality of user-manipulated input controls.

6. The method of claim 1, wherein the dynamic assignment of functionality is based on a current position of the detected object relative to the plurality of user-manipulated input controls.

7. The method of claim 1, wherein assigning functionality to the plurality of user-manipulated input controls includes assigning a plurality of alternative functions to at least one of the plurality of user-manipulated input controls, and the method further comprises allowing the user to select among the plurality of alternative functions.

8. The method of claim 7, wherein allowing the user to select comprises displaying a visual identification for each of the alternative functions, when an object is detected proximate to said input control having the alternative functions.

9. The method of claim 8, wherein displaying a visual identification for each of the alternative functions comprises cycling through said alternative functions by displaying each corresponding visual identification one at a time.

10. A method for facilitating an interaction between an electronic system and a user in accordance with a legacy software application, the electronic system including a computing system and an input device, the computing system comprises of a display, a processor, and one or more sensors for detecting a present object, the input device comprises of a plurality of user-manipulated input controls, the method comprising:
    executing the legacy application with the processor;
    executing a supplemental software program with the processor, to identify a plurality of interactive features for the legacy application, wherein the one or more interactive features include at least one feature that does not correspond to an interactive feature provided by the legacy application; and
    physically reconfiguring the plurality of user-manipulated input controls and assigning functionality to said plurality of user-manipulated input controls as reconfigured, by the processor and based on the plurality of identified interactive features;
    receiving an input from the user via one or more of the user-manipulated input controls;
    processing the input at least partly by the supplemental software program; and
    providing a result of said processing to the legacy application,
    wherein the supplemental software program is a plugin, and
    wherein said physically reconfiguring and said assigning functionality are further based on a current position of the user relative to the user-manipulated input controls as detected by the sensors.

11. The method of claim 10, wherein said physically reconfiguring comprises modifying a size and number of the plurality of user-manipulated input controls that can be individually actuated.

12. The method of claim 10, further comprising displaying a visual depiction of the assigned functionality.

13. The method of claim 12, wherein the visual depiction reflects a spatial layout of corresponding reconfigured ones of the plurality of user-manipulated input controls.

14. A non-transitory computer readable storage device containing an executable program for facilitating an interaction between an electronic system and a user in accordance with a legacy software application, the electronic system comprising a computing system and an input device, the computing system comprises of the legacy software application, a display, a processor, and one or more sensors for detecting a present object, and the input device comprises of a plurality of user-manipulated input controls, where the program performs steps comprising:

executing the legacy application with the processor;
executing a supplemental software program with the processor, to identify a plurality of interactive features for the legacy application;
dynamically assigning functionality to the plurality of user-manipulated input controls based on the plurality of identified interactive features;
displaying a visual depiction of the assigned functionality on the display of the computing system;
receiving an input from the user via one or more of the user-manipulated input controls;
processing the input at least partly by the supplemental software program; and
providing a result of said processing to the legacy application
wherein the functionality assigned to any given one of the plurality of user-manipulated input controls varies dynamically depending upon whether the one or more sensors detect an object proximate to the given one of the plurality of user-manipulated controls,
wherein the plurality of identified interactive features includes at least one feature that does not correspond to an interactive feature provided by the legacy application, and
wherein the supplemental software program is a plugin.

15. A non-transitory computer readable storage device containing an executable program for facilitating an interaction between an electronic system and a user in accordance with a legacy software application, the electronic system including a computing system and an input device, the computing system comprises of a display, a processor, and one or more sensors for detecting a present object, the input device comprises of a plurality of user-manipulated input controls, where the program performs steps comprising:
executing the legacy application with the processor;
executing a supplemental software program with the processor, to identify a plurality of interactive features for the legacy application, wherein the one or more interactive features include at least one feature that does not correspond to an interactive feature provided by the legacy application; and
physically reconfiguring the plurality of user-manipulated input controls and assigning functionality to said plurality of user-manipulated input controls as reconfigured, by the processor and based on the plurality of identified interactive features;
receiving an input from the user via one or more of the user-manipulated input controls;
processing the input at least partly by the supplemental software program; and
providing a result of said processing to the legacy application,
wherein the supplemental software program is a plugin, and
wherein said physically reconfiguring and said assigning functionality are further based on a current position of the user relative to the user-manipulated input controls as detected by the sensors.

* * * * *